US012793155B2

(12) United States Patent
Rezajoo

(10) Patent No.: US 12,793,155 B2
(45) Date of Patent: Nov. 10, 2026

(54) SYSTEMS AND METHODS FOR COLLABORATIVE TRAINING IN A GRAPHICALLY SIMULATED VIRTUAL REALITY (VR) ENVIRONMENT

(71) Applicant: Truist Bank, Charlotte, NC (US)

(72) Inventor: Ali Rezajoo, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 19/058,412

(22) Filed: Feb. 20, 2025

(65) Prior Publication Data

US 2025/0191097 A1 Jun. 12, 2025

Related U.S. Application Data

(63) Continuation of application No. 18/049,039, filed on Oct. 24, 2022, now Pat. No. 12,266,028.

(51) Int. Cl.

| | |
|---|---|
| ***G06Q 30/00*** | (2023.01) |
| ***G06F 3/04815*** | (2022.01) |
| ***G06Q 50/20*** | (2012.01) |
| ***G06T 17/00*** | (2006.01) |

(52) U.S. Cl.

CPC ..... *G06Q 50/2057* (2013.01); *G06F 3/04815* (2013.01); *G06T 17/00* (2013.01)

(58) Field of Classification Search

None

See application file for complete search history.

(56) References Cited

U.S. PATENT DOCUMENTS

2004/0115596 A1* 6/2004 Snyder .................... G09B 7/02 434/118
2007/0226010 A1 9/2007 Larsen
2009/0089153 A1* 4/2009 Minert ............... G06Q 10/0639 705/7.13
2011/0004481 A1* 1/2011 Jones ...................... G06F 3/011 705/1.1

(Continued)

OTHER PUBLICATIONS

A. Tate et al., "I-Room: A Virtual Space for Intelligent Interaction," in IEEE Intelligent Systems, vol. 25, No. 4, pp. 62-71, Jul.-Aug. 2010, doi: 10.1109/MIS.2010.5. (Year: 2010).*

(Continued)

*Primary Examiner* — Matthew T Sittner
(74) *Attorney, Agent, or Firm* — Michael A. Springs, Esq.; Shumaker, Loop & Kendrick, LLP; Patrick B. Horne

(57) ABSTRACT

A system provides for collaborative training in a graphically simulated virtual reality (VR) environment by causing display, by at least one participant device, a first graphical indicium controlled by a first real-time human participant and causing display, by at least one other participant device, a second graphical controlled by a second real-time human participant. A training session is conducted via virtual interaction of the first graphical indicium and the second graphical indicium in the three dimensional virtual reality environment. The first graphical indicium is displayed in the three dimensional virtual reality environment to said second real-time human participant by said at least one participant device. The second graphical indicium is displayed in the three dimensional virtual reality environment to said first real-time human participant by said at least one other participant device.

15 Claims, 6 Drawing Sheets

(56) References Cited

U.S. PATENT DOCUMENTS

| | | | | |
|---|---|---|---|---|
| 2011/0072367 | A1* | 3/2011 | Bauer | G06F 3/04815 715/757 |
| 2012/0123758 | A1* | 5/2012 | Kevan | G09B 19/00 703/6 |
| 2014/0234826 | A1* | 8/2014 | Breznitz | G09B 5/00 434/362 |
| 2015/0294405 | A1 | 10/2015 | Hanson | |
| 2018/0036591 | A1 | 2/2018 | King | |
| 2018/0322783 | A1* | 11/2018 | Toyoda | B60K 35/21 |
| 2020/0038119 | A1* | 2/2020 | Geri | G06F 16/53 |
| 2020/0050256 | A1* | 2/2020 | Yamamoto | G06F 3/0346 |
| 2020/0097081 | A1* | 3/2020 | Stone | G06F 3/015 |
| 2020/0293174 | A1* | 9/2020 | Diaz | A61B 5/744 |
| 2020/0410894 | A1* | 12/2020 | May | G09B 19/0053 |
| 2021/0072947 | A1* | 3/2021 | Anderson | G06F 3/011 |
| 2021/0127004 | A1* | 4/2021 | Caron | G06V 40/174 |
| 2021/0201588 | A1* | 7/2021 | Yerli | G06F 3/011 |
| 2021/0240503 | A1 | 8/2021 | Maitra | |
| 2021/0264810 | A1* | 8/2021 | Johnson | G09B 9/00 |
| 2021/0366193 | A1* | 11/2021 | Goetgeluk | G06T 19/003 |
| 2022/0094739 | A1* | 3/2022 | Vestemean | G06F 21/6209 |
| 2022/0207818 | A1* | 6/2022 | Allen | G06T 15/20 |
| 2022/0398652 | A1* | 12/2022 | Armstrong | G06Q 10/40 |
| 2023/0093979 | A1* | 3/2023 | Stauber | G06V 40/20 345/419 |
| 2023/0244877 | A1* | 8/2023 | Goyal | G06F 40/35 704/9 |
| 2023/0290263 | A1* | 9/2023 | King | G09B 9/052 |
| 2023/0386138 | A1* | 11/2023 | Donderici | B60W 60/001 |

OTHER PUBLICATIONS

J. Kuljis and D. Y. Lees, "Lessons from industry in the design of virtual collaborative learning environments," ITI 2002. Proceedings of the 24th International Conference on Information Technology Interfaces (IEEE Cat. No. 02EX534), Cavtat, Croatia, 2002 (Year: 2002).*

Korean Intellectual Property Office Received Avaya Inc's Patent Application for Enhanced Communication Between Remote Participants Using Augmented and Virtual Reality, Global IP News. Information Technology Patent NewsNew Delhi: Pedia Content Solutions Pvt. Ltd. (Apr. 4, 2017) (Year: 2017).

Study of Intelligence Virtual Maintenance Training System Base on STEP Standard, Wang, Feng Chan; Sun, You Chao; Zhao, Chen Yang. Applied Mechanics and Materials 152-154: 1453. Zurich: Trans Tech Publications Ltd. (Jan. 2012) (Year: 2012).

Avatar Coaching: A case study on the perceptions of virtual reality coaching interventions with an avatar coach, Andrews, Angelique R . . . ProQuest Dissertations and ThesesProQuest Dissertations & Theses. (2014) (Year: 2014).

FT.com site: Virtually real estate, Harkin, James. FT.com: 1. London: The Financial Times Limited. (Mar. 2, 2007) (Year: 2007).

* cited by examiner

SYSTEMS AND METHODS FOR COLLABORATIVE TRAINING IN A GRAPHICALLY SIMULATED VIRTUAL REALITY (VR) ENVIRONMENT

CROSS REFERENCE TO RELATED APPLICATIONS

This application is a continuation of and claims priority to co-pending U.S. patent application Ser. No. 18/049,039 filed Oct. 24, 2022, entitled SYSTEMS AND METHODS FOR COLLABORATIVE TRAINING IN A GRAPHICALLY SIMULATED VIRTUAL REALITY (VR) ENVIRONMENT, the entirety of which is hereby expressly incorporated by reference.

FIELD

This invention relates generally to the field of graphical modeling, and, more particularly, embodiments of the invention relate to real time communications among participants in a graphically simulated training environment.

BACKGROUND

Virtual reality (VR) technology has become a household term and is now present in many homes as an entertainment form for children and teens. The immersive experience available through VR is increasingly being used, not just as an in-home entertainment means, but also as a way to connect people at different locations through the internet as networks improve and home access becomes more ubiquitous.

Employers are increasingly relying on remote and/or geographically separated work forces. Job duties that put employees in front of clients and consumers require interpersonal skills, especially in a world where one dissatisfactory statement or reaction by a customer service representative can result almost immediately in an online review or even a video that goes viral and represents a business entity, fairly or not, at least for the news cycle life of the event in popular media.

Employers are also increasingly relying on home-based workers. Whether or not a worker ever greets a client or customer in person or online, essentially all of us interact with other people in traversing our jobs and careers. The need for "soft skills" is crucial in both customer relations jobs and in positions and work situations out of public view. Soft skills refer to, or require, attributes such as emotional intelligence, a team player attitude, a growth mindset, acceptance of constructive feedback, adaptability, active listening, and work ethic. While soft skills can be learned, they are not as readily delineated and taught as hard skills, which are more quantifiable and can be more clearly defined, measured, and taught in straight-forward conventional ways. When it comes to soft skills, things like small talk, empathy, and flexibility matter and they're not an exact science, but they are undeniably impactful on interpersonal relations, job appreciation, upward professional mobility, and employee retention. Hard skills land jobs, but soft skills are needed to progress in a career.

Improvements are needed in training systems and methods, for example to advance soft skills, by modes that are cost efficient, flexible, and applicable to geographically separated and even home-based work forces.

BRIEF SUMMARY

Embodiments of the present invention address the above needs and/or achieve other advantages by providing for collaborative training in a graphically simulated virtual reality (VR) environment.

A system for collaborative training in a graphically simulated virtual reality (VR) environment includes: a computing system including one or more processor and at least one of a memory device and a non-transitory storage device, wherein said one or more processor executes computer-readable instructions; and a network connection for operatively connecting the computing system to at least one participant device. Upon execution of the computer-readable instructions, the computing system performs steps including: causing display, by at least one participant device, of a first graphical indicium in a three dimensional virtual reality environment, the first graphical indicium controlled by a first real-time human participant; causing display, by at least one other participant device, of a second graphical indicium in the three dimensional virtual reality environment, the second graphical indicium controlled by a second real-time human participant; and conducting a training session via virtual interaction of the first graphical indicium and the second graphical indicium in the three dimensional virtual reality environment. The first graphical indicium is displayed in the three dimensional virtual reality environment to said second real-time human participant by said at least one participant device. The second graphical indicium is displayed in the three dimensional virtual reality environment to said first real-time human participant by said at least one other participant device.

In some examples, completion of the training session is defined by at least one criterion satisfaction, and upon completion of the training session, a digital certificate is generated and sent to at least one of said participant device and said other participant device.

Upon completion of the training session, the computing system may further cause display, on at least one of said participant device and said other participant device, of the digital certificate.

Upon completion of said training session, the computing system may further schedule a subsequent training session for which said training session is a prerequisite.

In some examples, the first real-time human participant is a trainee, and the second real-time human participant is at least one of a trainer, a supervisor, and a manager.

The computing system may further cause display in the three dimensional virtual reality environment, on said participant device and said other participant device, a graphical indicium representing a virtual agent.

The virtual agent may use artificial intelligence (AI) and automatically conduct conversational communication with at least one of said participant device and said other participant device.

For example, the first real-time human participant may be a customer service trainee; the second real-time human participant may be a trainer, a supervisor, and/or a manager; and the virtual agent may operate as a simulated customer receiving simulated customer service by the first real-time human participant for training of the first real-time human participant.

The three dimensional virtual reality environment may be generated using a three-dimensional model based at least in part on photogrammetry.

In at least one embodiment, a system for collaborative training in a graphically simulated virtual reality (VR)

environment includes: a computing system including one or more processor and at least one of a memory device and a non-transitory storage device, wherein said one or more processor executes computer-readable instructions; and a network connection for operatively connecting the computing system to at least one participant device. Upon execution of the computer-readable instructions, the computing system performs steps including: causing display to a trainee, by a VR-equipped participant device, of a first graphical indicium in a three dimensional virtual reality environment, the first graphical indicium controlled by, at least in part, at least one of: a trainer; and a virtual agent. A training session is conducted via virtual interaction of the trainer, via the VR-equipped participant device, with the first graphical indicium in the three dimensional virtual reality environment.

The first graphical indicium may be controlled by, at least in part, the virtual agent. The virtual agent may use artificial intelligence (AI) and automatically conduct conversational communication with the trainer via VR-equipped participant device.

In at least one embodiment, a method is provided for a computing system to conduct collaborative training in a graphically simulated virtual reality (VR) environment, the computing system including one or more processor, at least one of a memory device and a non-transitory storage device, and a network connection for operatively connecting the one or more processor to at least one user device. The one or more processor is configured to execute computer-readable instructions. The method includes, upon execution of the computer-readable instructions: causing display, by at least one participant device, of a first graphical indicium in a three dimensional virtual reality environment, the first graphical indicium controlled by a first real-time human participant; causing display, by at least one other participant device, of a second graphical indicium in the three dimensional virtual reality environment, the second graphical indicium controlled by a second real-time human participant; and conducting a training session via virtual interaction of the first graphical indicium and the second graphical indicium in the three dimensional virtual reality environment. The first graphical indicium is displayed in the three dimensional virtual reality environment to said second real-time human participant by said at least one participant device. The second graphical indicium is displayed in the three dimensional virtual reality environment to said first real-time human participant by said at least one other participant device.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
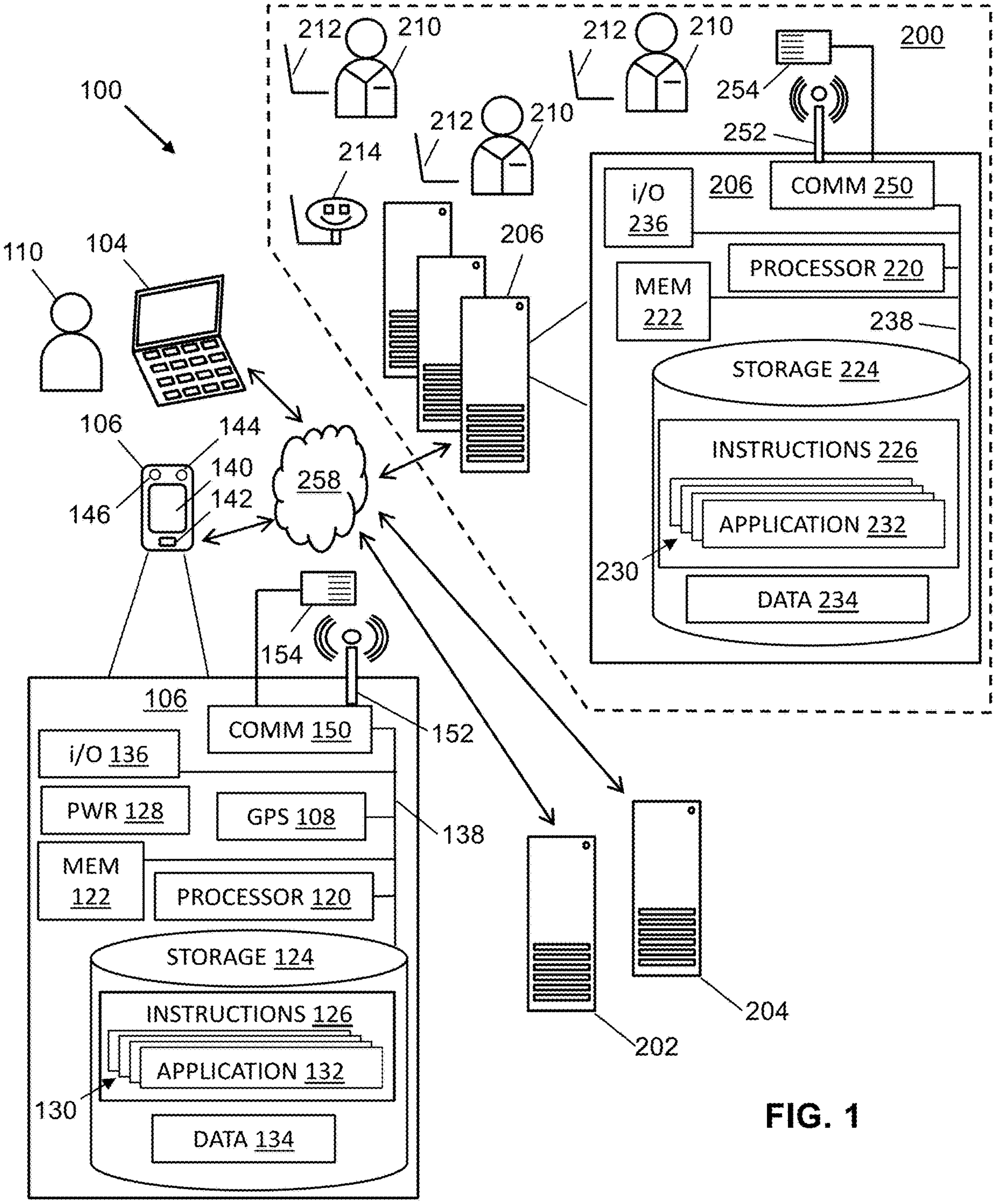
Figure 2A:
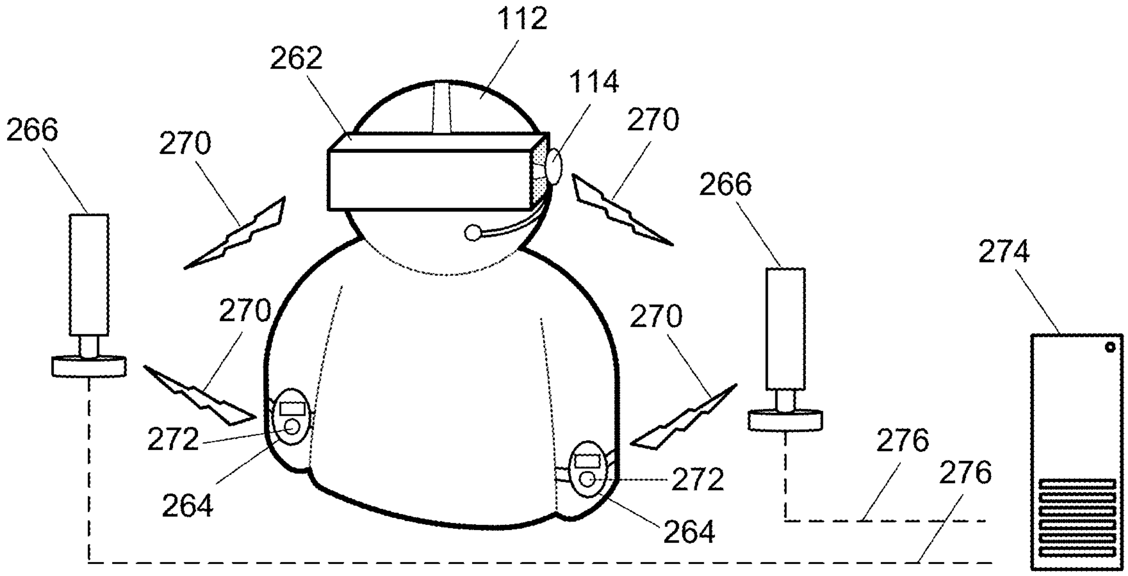

Having thus described embodiments of the invention in general terms, reference will now be made to the accompanying drawings, wherein:

FIG. 1 illustrates an enterprise system and environment thereof for navigating context conversion in geometric modeling, in accordance with at least one embodiment of the present invention;

FIG. 2A illustrates equipment items, according to at least one embodiment, used in a virtual reality (VR) session.

Figure 2B:
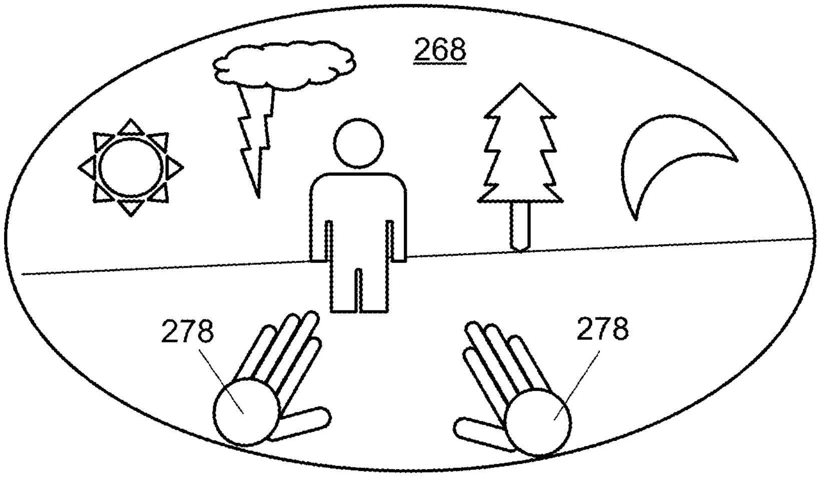

FIG. 2B shows a user view of a simulated environment in a VR session via a helmet or visor.

Figure 3A:
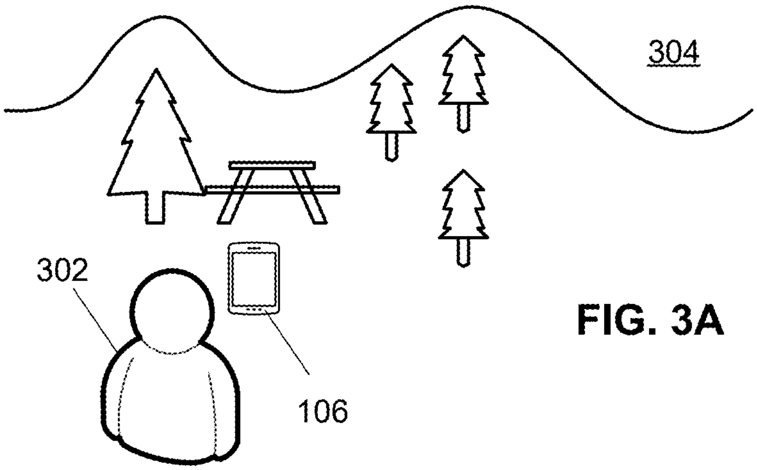

FIG. 3A illustrates an AR session in which a user views a background scene through an AR equipped mobile device.

Figure 3B:
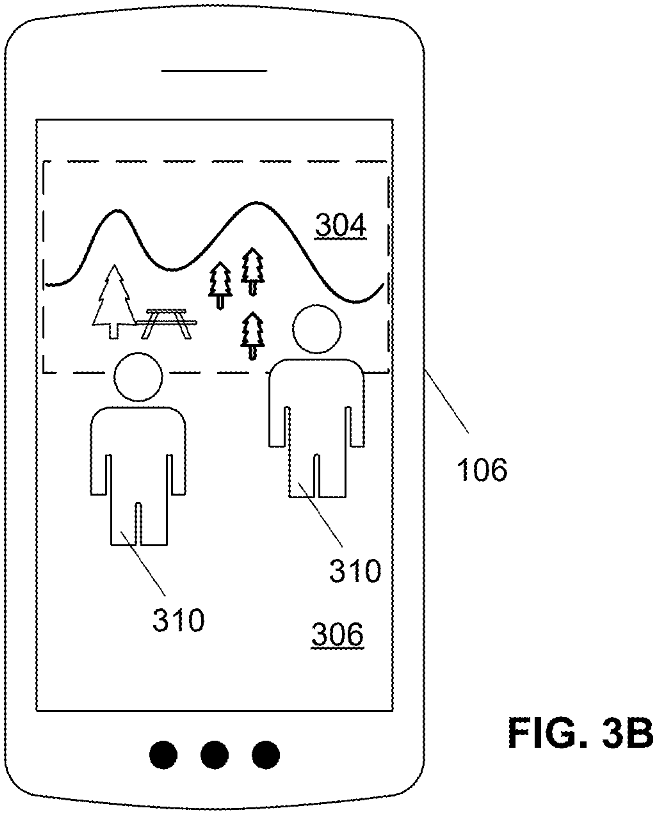

FIG. 3B shows the AR image on the mobile device.

Figure 4A:
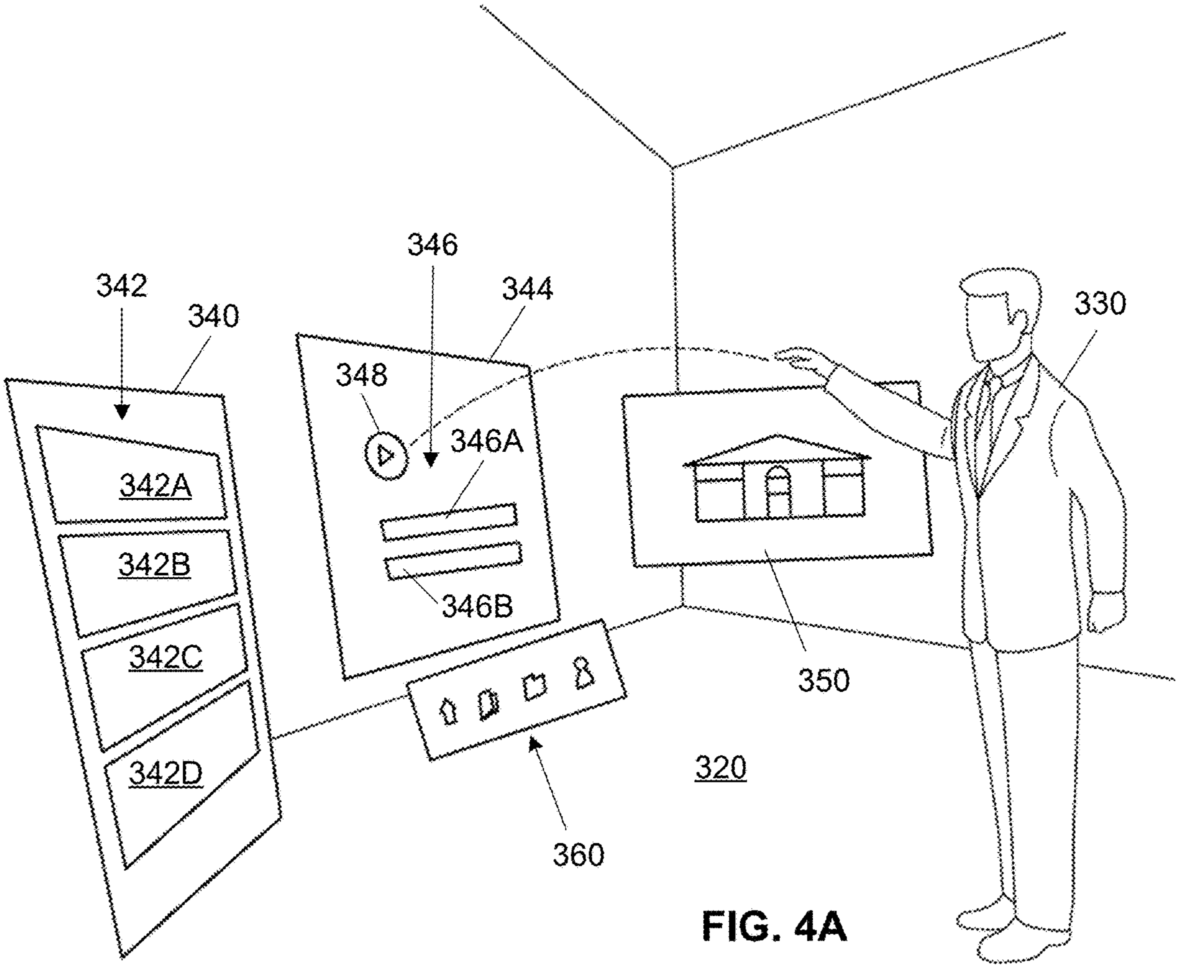

FIG. 4A shows a graphically simulated virtual reality (VR) environment for at least scheduling training according to at least one embodiment.

Figure 4B:
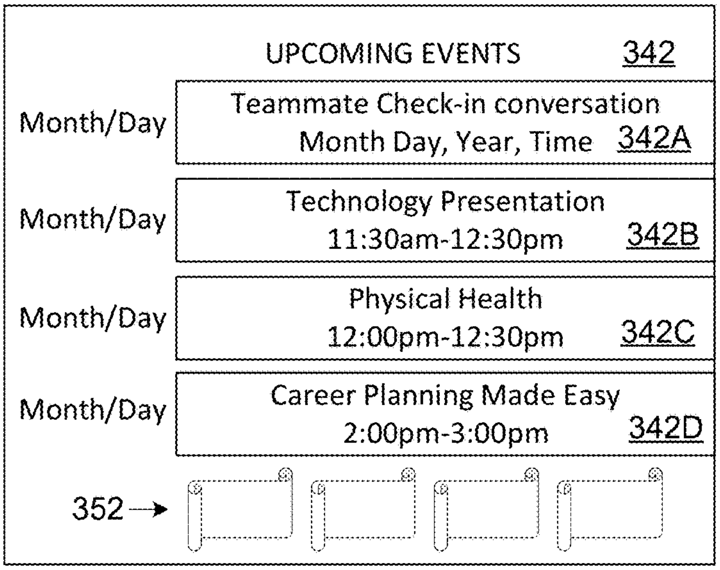

FIG. 4B shows a virtual information display screen displaying an information table having several timetable items.

Figure 5:
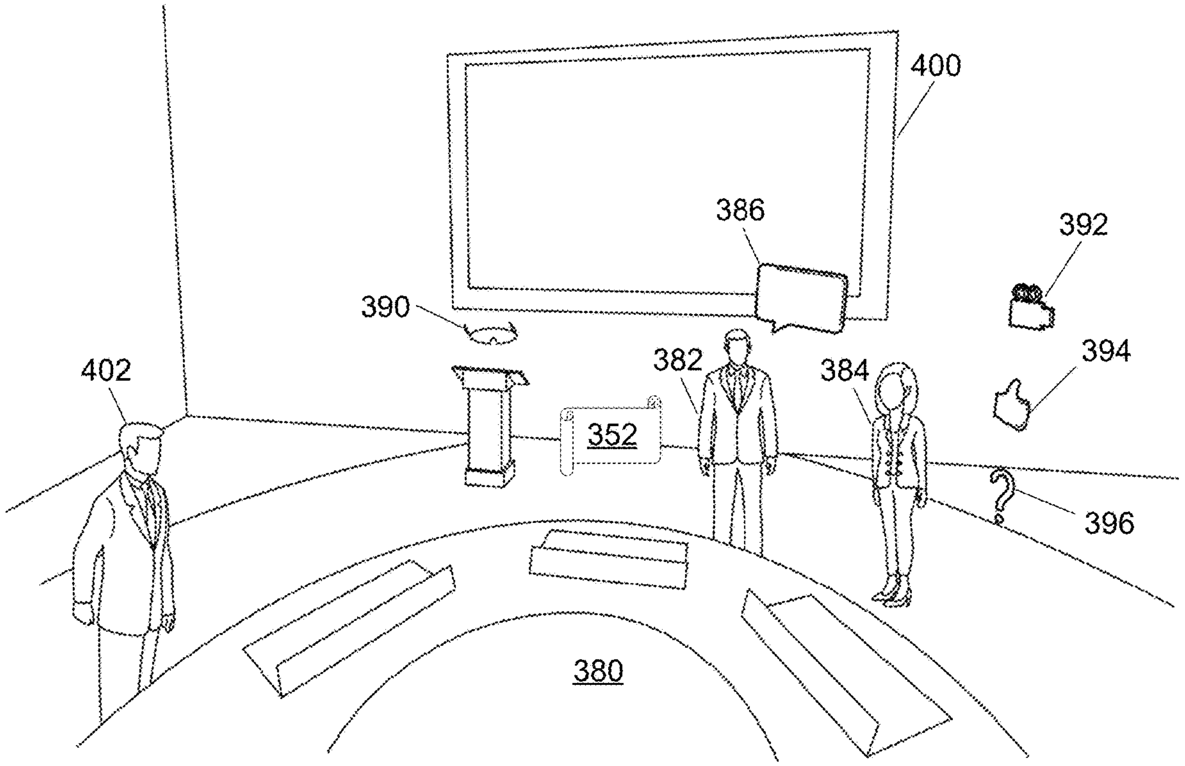

FIG. 5 illustrates a three dimensional virtual reality training environment, according to at least one embodiment.

Figure 6:
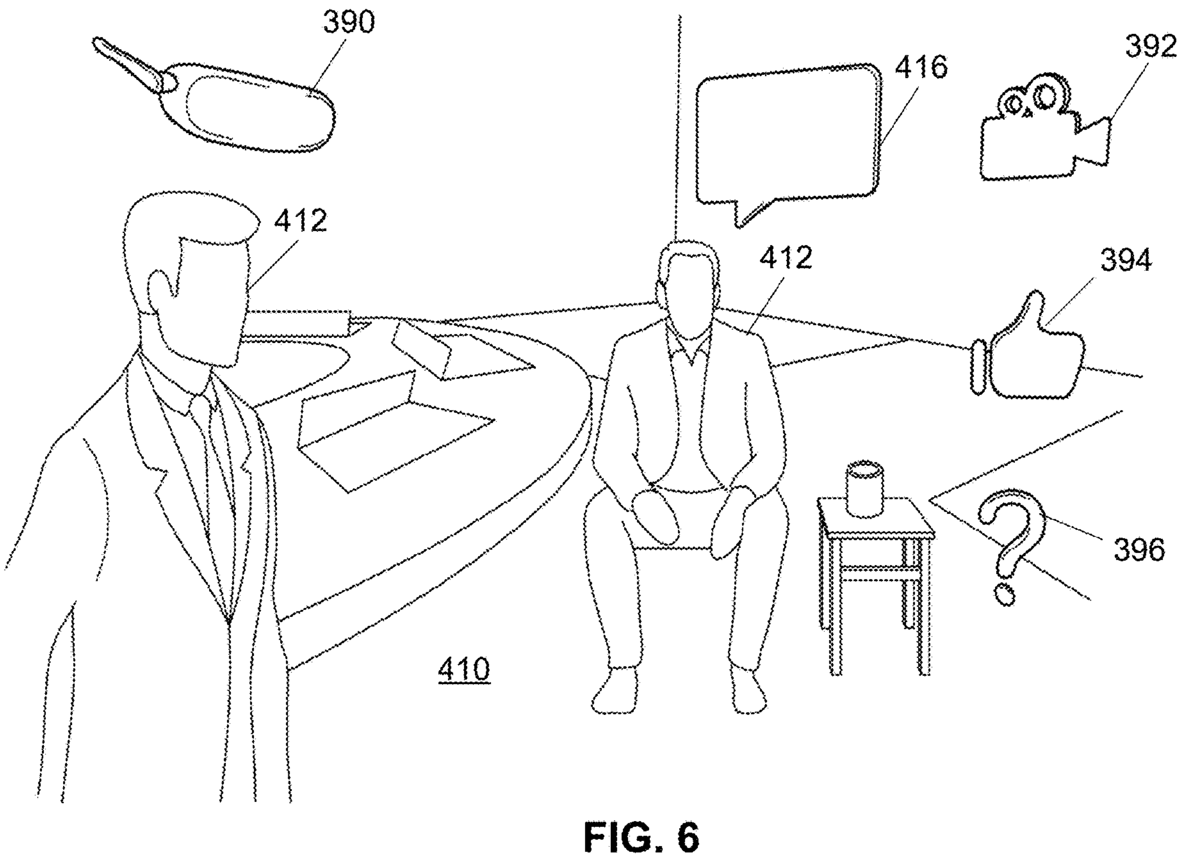

FIG. 6 illustrates another three dimensional virtual reality training environment, according to at least one other embodiment.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions. The user 110 in other examples may represent an agent, employee, a remote employee, a work-at-home employee, a trainer, a trainee, an authority, an auditor, contractor or other interested party of an enterprise entity.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

The above-described systems and computing devices, in some embodiments, are used in whole or in part to implement virtual reality (VR) and/or augmented reality (AR) functioning. Virtual reality refers to a computer-generated simulation of a three-dimensional image or environment that can be interacted with in a seemingly real or physical way by a person using special electronic equipment, such as a visor or helmet with an internal screen, and gloves, hand-held controller, and/or other effects fitted with sensors. A VR experience is typically immersive, offering the user a typically entirely artificial computer-generated environment. As vision of the real world around the user is occluded by a visor or helmet, a VR session typically occurs indoors and/or in a safe controlled environment for the safety of the user. VR equipment items are typically interactive devices represented in FIG. 2A as a visor or helmet 262, hand-held or mounted controllers 264, and sensors 266. Connections 270 in FIG. 2A represent interconnectivity among the visor or helmet 262, controllers 264, and sensors 266. The connections 270 may be wireless as represented in FIG. 2A and/or may included wired connections as well.

A microphone serving as input device for example for voice input by the participant 112, and a speaker or earphone serving as an output device to the participant 112, are referenced together in FIG. 2A as a headset 114 worn by the participant. A VR session in some instances includes bidirectional communication, for example among human participants conversing in real time with natural or modified voices. In other instances, a human participant 112 may communicate, for example in voice communication with a virtual agent 214 participating in a collaborative VR session.

VR applications immerse the user in a computer-generated environment (FIG. 2B) that simulates reality through the use of the interactive devices. The helmet or visor provides the user with a stereoscopic view 268 of animated images in the simulated environment. The illusion of "being there" (telepresence) is effected by motion sensors that pick up the user's movements to enable adjustment of the view provided the user in real time. Thus, a user can tour a simulated suite of rooms, experiencing changing viewpoints and perspectives that are convincingly related to their own head turnings and steps. The hand-held or mounted controllers 264 typically include buttons and/or triggers 272 by which user actions are relayed to the participant device 274 to effect user control of their simulated character and/or to implement user actions with the simulated environment. The hand-held or mounted controllers 264 can be equipped with force-feedback devices that provide the sensation of touch. The hand-held or mounted controllers 264 can be ergonomically formed for comfort and secure grasp in use.

A visual VR session is illustrated in FIG. 2B. Audio information may be provided as well, for example via speakers within or mounted on the visor or helmet 262 or other nearby equipment items. A VR session can be used for gaming, viewing information, navigation, and many other uses. The user can, for example, pick up and manipulate objects that they see in the virtual environment. Visual confirmation of hand-held items and their manipulation can be presented to the user in the simulated environment via a simulated view of the hands, which may appear as character hands 278, such as robot, alien, athlete, soldier or other character hands. Indeed, a whole body or partial body representative of the user may be displayed in graphical form, such as an avatar or other graphical indicium under user control. Portions of such an avatar or other graphical indicium may be displayed to the user from virtual eye perspective according to body position. In some examples, a graphical indicium representing and/or controlled by the user can be as minimal as a cursor or other indicator. For example, a participant in a VR session may prefer a first person perspective, as through the eyes of their virtual character, such that minimal view of the virtual character's form may be seen by the participant. In other examples, a participant may prefer a floating or third-person perspective, in which case a more extensive view of the participant's virtual character, or avatar, may be seen.

A typical user in a VR presentation as viewed for example by another participant is represented by a personalized and movable graphical indicium defining an avatar. These personalized user-representative and user-controlled graphical indicia can take different forms or shapes. A typical user deploys their customized graphical indicium as their representative presence in any given virtual world.

Like a user's physical form, a customized graphical indicium may have many outward appearances by use of accessories amounting to virtual clothing, costumes, and gear. Continuity of a customized graphical indicium, for example by which users recognize each other in their shared virtual experiences, is provided by a base form, in correspondence for example to a human body. For descriptive purpose, the underlying base form of a customized graphical indicium is referenced herein as an object frame. Like a physical body, an object frame can be endowed with humanoid on animal-like attributes, like lower and upper torsos, operable limbs, and faces capable of exhibiting non-verbal cues. In a typical deployment, a customized graphical indicium may include user-selected graphical accessories overlaying the object frame like clothing or other layers.

Connections 276 in FIG. 2A represented interconnectivity between the sensors and/or other interactive devices with the participant device 274 by which calculations and/or other operations are conducted or conveyed to dynamically produce the changing simulated environment of the VR session, in which user actions such as hand movements, head movements (looking up, down, left, and right), and user-positioning, within a safe environment, are typically all represented. The connections 276 may be wired as represented in FIG. 2A and/or may be or include wireless connections as well. The participant device 274 may represent any of the user computing device 104, the mobile device 106, the computing system 206 of the enterprise system 200, the agent devices 212, the external systems 202 and 204 (FIG. 1), and or other terminal through which or by which the VR session is conducted.

The VR session participant 112 in FIG. 2A may represent a consumer or client of an enterprise entity, for example corresponding to a user 110 in FIG. 1*n* various such instances, the participant 112 may utilize personal computing and mobile devices in participating the VR session, for example as represented by the computing device 104 and/or the mobile device 106 in FIG. 1. In other such instances, the participant 112 may utilize computing devices of the enterprise entity, for example as represented for example by agent devices 212 in FIG. 1 or other devices and systems disclosed at least by this description.

The VR session participant 112 in FIG. 2A may represent an agent, an employee, a trainer, a trainee, an authority, an auditor, a contractor or other interested party of an enterprise entity, in non-limiting examples, for example corresponding to an agent 212 in FIG. 1. In various such instances, the participant 112 may utilize personal computing and mobile devices in participating the VR session, for example as represented by the computing device 104 and/or the mobile device 106 in FIG. 1, and the user 110 may be a work-at-home employee, a remote employee, or other agent of an enterprise entity. In other such instances, the participant 112 may utilize computing devices of the enterprise entity, for example as represented for example by agent devices 212 in FIG. 1 or other devices and systems disclosed at least by this description.

Display, displaying, causing to display, causing display, and similar terms in these descriptions with reference to FIGS. 4-8 describe at least VR presentations to a user as in FIGS. 2A-2B, AR presentations to a user as in FIGS. 3A-3B, and other displayed presentation types. Causing display on or by a device includes, for example, causing visual displays on a screen of a laptop, smart phone, flip phone, tablet, or other joined, coupled, or unitary device directly including a resident display screen. Causing display on or by a device also refers to displays on screens, projectors, monitors, terminals, VR visualization devices, and other video producing, enhancing and casting devices connected to other devices of which laptop computers, desktop computers, computing devices are non-limiting examples whether or not a display screen is resident, built-in, or inseparable from another device.

In some embodiments, training and scheduling thereof can be implemented in VR sessions as expressly described herein. In other embodiments, training and scheduling thereof can be implemented in AR sessions. Augmented reality (AR) refers to the integration of digital information with the user's environment in real time. Unlike virtual reality (VR), which creates a totally artificial environment, AR users experience a real-world environment with computer-generated perceptual information visually combined or overlaid on real world images. The computer-generated simulation of a three-dimensional image or environment can be interacted with in a seemingly real or physical way, typically using a mobile phone such as the user mobile device 106. Because an AR experience does not typically greatly occlude the user's view of their real environment, AR use is potentially more mobile and safer to use outdoors and/or in less controlled environments than VR. However, electronic equipment, such as the visor or helmet 262 (FIG. 2A) and hand-held or mounted controllers 264 may be used as well.

FIG. 3A illustrates an AR session in which a user 302 views a background scene 304 through an AR equipped mobile device 106. FIG. 3B shows the AR image 310 on the mobile device 106. A visual AR session is illustrated. Audio information may be provided as well via speakers of the device 106. The AR image 306 includes characters 310 combined with or overlaid in the background scene 304. Any number of artificial characters and/or objects can be included. An AR session can be used for gaming, viewing information, navigation, and many other uses.

Training of VR session participants is enabled by the above-described systems, devices, and methods expressed or implied, in inventive implementations thereof. In some embodiments, agents of a first entity are trained to improve client communication skills, for example in preparation for meeting consumers in branch locations and contact centers. Soft skills can be trained and enhanced to improve work place culture, employee/employer relations, and employee retention. Interactive scenarios can be introduced and acted upon in an immersive experience.

In the VR training solutions described herein, in various embodiments, multi-user sessions are conducted where participants talk, interact and brainstorm together in a VR environment. Multiple participants are encouraged and enabled to think and visualize together in VR rooms. VR training herein provides an ability to mimic real-life work challenges to prepare participants for interacting amongst themselves and to interact with clients, consumers, and the public overall. VR training herein is useful for soft skills assessment and improvement, and can provide a safe environment in practicing situations where an emotional impact may occur. VR training described herein fosters cooperation and a team approach to problem solving and client relations.

Impact of the VR training solutions described herein are to include enhancing user empathy and care, enhancing job performance and decision-making, and reducing the real time needed to train compared to traditional methods, for example at least by reducing or eliminating trainee and trainer travel times and overhead costs involved in physical-space training centers and facilities.

In examples in which the first entity and/or enterprise entity provides financial services and/or operates as a financial institution, VR training as described herein can be useful for branch job positions, including, as non-limiting examples: teller, banker, personal banker, loan processor, investment representative, mortgage consultant, credit analyst, relationship manager, financial advisor, financial analyst asset manager, internal auditor, underwriter, investment banker, investment banking analyst, and loan officer. VR training, once completed can improve performance indicators in a call center environment, for example, by reducing holding times of waiting customers, bringing new agents to expected competency faster than other training modes, and resolving client issues more efficiently. The power of people seeing things happening right in front of them, even in a simulated environment, is brought to fruition by VR training as described herein.

FIG. 4A illustrates a VR presentation or session in which a participant interacts with virtual objects in a three dimensional virtual reality environment 320 shown as a simulated room environment. The participant is represented by a movable graphical indicium 330. In the illustrated example, the graphical indicium 330 is represented as an avatar in whole body view, as seen for example by an observer. In practice in a VR presentation, portions of such an avatar may be displayed to the user, for example as arms and other body parts as viewed from virtual eye perspective according to body position. A graphical indicium representing and/or controlled by the user can be as minimal as a cursor or other indicator.

The VR presentation or session is conducted, in various embodiments, to schedule training in a graphically simulated virtual reality (VR) environment. The VR presentation or session can be conducted, in whole or in part, by the computing system 200 (FIG. 1) or in operative communication and/or cooperation with the computing system 200 (FIG. 1) having one or more processor 220 and at least one of a memory device 222 and a non-transitory storage device 224. The processor is configured to execute computer-readable instructions. A network connection 258 operatively connects the computing system to at least one participant device 274 (FIG. 2A). Upon execution of the computer-readable instructions, the computing system causes a display, by at least one participant device 274, for example via the visor or helmet 262, to at least one real-time human participant 112, of a training session timetable in a three dimensional virtual reality environment, the training session timetable including an operable indicator associated at least with a particular training session. The participant 112 controls the graphical indicium 330 in the three dimensional virtual reality environment 320.

In the example of FIG. 4A, a virtual information display screen 340 is shown displaying, in the three dimensional virtual reality environment 320, an information table 342 having several timetable items, at least some of which correspond to scheduled training sessions available for selection. The information table 342 in some instances constitutes a training session timetable and can include a calendar of upcoming events. Particular non-limiting examples are shown in FIG. 4B, in which the virtual information screen 340 is shown in two dimensional view for illustration of the information displayed and, for example, how the virtual information screen 340 would be viewed from the eye-view perspective of the graphical indicium 330. The timetable items are referenced as item 342A, 342B, 342C and 342D.

A virtual information display screen 344 is shown in FIG. 4A displaying, in the three dimensional virtual reality environment 320, an information table 346 having several timetable items referenced as 346A and 346B, corresponding to respective scheduled training sessions available for selection. The information table 346 in some instances constitutes a training session timetable and can include a calendar of upcoming events. In non-limiting examples, the timetable items referenced as 346A and 346B have respective captions being "Consumer training" and "Business training." Many types of training upcoming events may be represented for attendance or scheduling, including training for soft skills, hard skills, non-discrimination, and other subjects.

In the illustrated example, at least the indicator 348 is an operable indicator associated at least with a particular training session. Upon virtual actuation of the operable indicator, the computing system causes a display, by the at least one participant device to the real-time human participant 112, of the particular training session in a corresponding three dimensional virtual reality environment. From the participant perspective, the VR session or presentation transitions from the three dimensional virtual reality environment 320 to another, for example to the three dimensional virtual reality environment 380 of FIG. 5, which is illustrated as a training center.

In at least one example, the indicator 348 includes a caption "Fair lending 45 minutes" and virtual actuation of the operable indicator, for example by virtual action of the graphical indicium 330 as controlled by a participant 112 (FIG. 2) using a VR equipped device or system, causes virtual travel to the three dimensional virtual reality environment 380 of FIG. 5 for collaborative training in a continued VR session. Any of the timetable items in the example of FIG. 4A can be an operable indicator associated with a particular training session, and virtual actuation thereof, for example by virtual action of the graphical indicium 330 as controlled by a participant 112 (FIG. 2) using a VR equipped device or system, causes virtual travel or transition to a corresponding training session, with may be presented in a three dimensional virtual reality environment.

A virtual information display screen 350 is shown in FIG. 4A displaying, for example, a home office, a branch office, or an iconic representation of a first entity. The illustrated icon may function as an operable indicator, the actuation of which may cause virtual travel or reappearance at a home screen or a corresponding three dimensional virtual reality environment. A menu 360 of navigation functions, each also defining an operable indicator, is also shown in the three dimensional virtual reality environment 320 for use by a participant 112, for example by virtual action of the graphical indicium 330 under participant control.

Satisfactory completion of training in some instances results in certificates awarded to trainees. The virtual information display screens in FIG. 4A, for example, may include indicators and/or items, which may be operable indicators for example functioning as links or hyperlinks, that display, correspond to and/or list a participant's awarded certificates. Certificates, such as digital certificates, and other distinctions, awards, and notifications are, in some instances, upon completion of a training session, generated and automatically sent to participant devices. An information table, for example table 342 in FIG. 4B, can be automatically populated with an automatically generated digital certificate 352 for display on virtual information display screens (340, 344) as in FIG. 4A.

The three dimensional virtual reality environment 320 of FIG. 4, shown as a simulated room environment, may serve as a particular participant's virtual office where the participant's avatar returns after or between training sessions. For example, a trainee can virtually return to or arrive at the environment 320 to view earned certificates 352, to view slides and other learning content, to view requirements for passage of exams to earn certificates, and to review what certificates are already earned.

The virtual information display screens can show calendars detailing past, current, and upcoming events, as well as accomplishments, milestones, chat sessions, event invitations, and more. VR Training is made available by navigational functions (see menu 360) and operable indicators (at least indicator 348) providing access to upcoming VR events and workshops, access to training sessions, the ability to invite managers and teammates, and the ability to share goals, accomplishments and certificates with managers. FIG. 4A illustrates, in at least one embodiment, in conjunction with FIGS. 1 and 3A and the corresponding above descriptions thereof, a system for scheduling training in a graphically simulated virtual reality (VR) environment and discloses methods for same by reference and implication in view of these descriptions.

FIG. 5 illustrates a VR presentation or session in which a participant interacts with virtual objects and other participants in a three dimensional virtual reality environment 380 shown as a simulated auditorium or learning center environment. Participants are represented by respective movable graphical indicia. In the illustrated example, the graphical indicia are represented as avatars in whole body view, as seen for example by an observer or floating point perspective for illustration of the collaborative environment. In practice, portions of each avatar and the environment overall may be displayed in different views and perspective to different participants according to their avatar positions or preferences.

The VR presentation or session of FIG. 5 is conducted, in various embodiments, for collaborative training in the graphically simulated virtual reality (VR) environment 380. As described above with reference to FIG. 4A, the VR presentation or session of FIG. 5 can be conducted, in whole or in part, by the computing system 200 (FIG. 1) or in operative communication and/or cooperation with the computing system 200 (FIG. 1). The VR presentation or session of FIG. 5, in some embodiments, is presented with continuity from that of FIG. 4A, for example as a VR session or presentation transitions from the three dimensional virtual reality scheduling environment 320 (FIG. 4A) to the three dimensional virtual reality training environment 380 of FIG. 5. In other embodiments, as session is initiated with the training environment 380 of FIG. 5 as an origin, and yet in other embodiments, the environment 380 is reached by transition from yet another environment.

In FIG. 5, a first graphical indicium 382 represents and is controlled at least in part by a first real-time human participant, and a second graphical indicium 384 represents and is controlled at least in part by a second real-time human participant. The referenced real-time participants can be understood as described with reference to the participant 112 of FIG. 2A without necessitating illustrating each separately. FIG. 5 represents conducting a training session via virtual interaction of the first graphical indicium 382 and the second graphical indicium 384 in the three dimensional virtual reality environment 380. In non-limiting examples, first real-time human participant, represented by the first graphical indicium 382 is a trainee, and the second real-time human participant, represented by the second graphical indicium 384, is a trainer, a supervisor, and/or a manager.

In FIG. 5, collaborative training can involve various story narratives and scenario randomization. Interactive conversations 386 such as question and answer interactions can occur. Trainee participants can have the ability to talk with managers during training. A trainee can ask a manager to join and/or track the session from any angle of the interaction.'

A VR headset 390 is graphically represented in FIG. 5, for example representing a trainer, manager, or other participant watching an interaction. Two people can be participating in a scenario. For example, talking about law or talking about other subjects. Icons representing navigational functions and operable indicators provide access to content such as videos 392, feedback 394 such as by approval, and queries 396. Videos and other information can be presented on one or more virtual information display screen 400. Approval by way of feedback 394 in some instances, for example as actioned by a trainer or manager, represents satisfactory completion of training in some instances results in a digital certificate 352 awarded to the trainee. An information table, for example table 342 in FIG. 4B, can be automatically populated with the certificate 352 once satisfactory completion of training is accomplished by way of at least one criterion satisfaction, which may be a duration, merit, score, trainer approval, or performance based criterion.

Any number of additional participants may be present in various examples of implementation of collaborative training in a graphically simulated virtual reality (VR) environment. In FIG. 5, an additional graphical indicium 402 can represent an observer and/or can represent a virtual agent 214 (FIG. 1), for example a virtual agent using artificial intelligence (AI) to automatically conduct conversational communication in the simulated virtual reality (VR) environment with other participants attending virtually via their respective participant devices.

FIG. 6 illustrates a VR presentation or session in which participants interact in a three dimensional virtual reality environment 410 shown as a simulated auditorium or learning center environment. Some participants are represented by respective movable graphical indicia. In the illustrated example, the graphical indicia are represented as avatars in whole body view. The VR session of FIG. 6 presents a scenario in which a graphical indicium 412 represents a simulated customer and a graphical indicium 414 represents and is controlled at least in part by a real-time human participant trainee. A VR headset 390 is graphically represented in FIG. 5, for example representing a real-time human participant manager watching an interaction and available to assist the trainee. The referenced real-time participants can each and separately be understood as described with reference to the participant 112 of FIG. 2A without necessitating illustrating each separately. The graphical indicium 412 representing a simulated customer may be controlled by a real-time human participant 112 or a virtual agent 214. In the scenario of FIG. 6, the simulated customer asks a question 416, for example about a loan or other subject.

In implementing inventive systems and methods according to these descriptions, dialogs, trainings, scheduling, and other interactions are facilitated as communication sessions in a virtual environment permitting teammates to join and interact. Participants can join training sessions and invite others. Multiple users can join together and communicate with each other in a common virtual environment. Trainer or managers who are listening and/or watching can assist with that training. An improved experience is attained for teammates. The impact of such training can include improved empathy with users and other soft skills, and performance of the job can be improved.

In implementing inventive systems and methods according to these descriptions, training is facilitated in a virtual environment. Thus information can be disseminated with a sense of personal interaction prior had by real travel of the user to a physical location such as a training center. Implementation of the inventive systems and methods according to these descriptions thereby reduces physical traffic and the associated thermal and atmospheric impact of, for example, automobile use. Thus, the function of roadways and other vehicular thoroughfares for needed services, such as emergency response vehicles, is improved by reduced congestion. Further, by facilitating personalization in question and answer sessions, wide casting of information across digital and other electronic media is reduced. Thus, data traffic on network connections is reduced, improving network efficiencies, reducing latencies, thereby improving the functioning or networked computers, and reducing operating costs.

The above advantages and features can be implemented in various system and device hardware examples, and can also be practiced as one or more methods, which are at least expressed by implication with the above described systems, and by which collaborative training in a graphically simulated virtual reality (VR) environment is enabled in keeping with the above descriptions. Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A method, comprising:

causing, by a processor, display of a three-dimensional (3D) virtual reality (VR) environment on a plurality of participant devices, each participant device associated with a respective participant of a plurality of participants;

causing, by the processor, display of a first avatar on a first participant device of the plurality of participant devices, wherein the first avatar is associated with a first participant of the plurality of participants, wherein the first participant is a customer service trainee;

causing, by the processor, display of a second avatar on a second participant device of the plurality of participant devices, wherein the second avatar is associated with a second participant of the plurality of participants, wherein the second participant is at least one of a trainer, a supervisor, and a manager;

determining, by the processor for the first and second participants, a respective subset of a plurality of training sessions;

outputting, by the processor in the 3D VR environment on the first and second participant devices, a respective timetable displaying the respective subset of the plurality of training sessions for the first and second participants, wherein the timetable displays at least one attribute of each training session in the respective subset of the plurality of training sessions for the first and second participants;

receiving, by the processor from the first and second participant devices, respective indications of input selecting a first training session of the respective subset of the plurality of training sessions displayed in the respective timetables on the first and second participant devices;

causing display, in the 3D VR environment on the first and second participant devices, a training room for the first training session;

deploying, by the processor in the training room, an artificial intelligence (AI)-based virtual agent that conducts conversational communication with training room participants, wherein the virtual agent, the first avatar, and the second avatar are displayed in the training room in the 3D VR environment, wherein the virtual agent operates as a simulated customer receiving simulated customer service by the first participant;

completing, by the first and second participant devices, the first training session via virtual interaction of the virtual agent, the first avatar, and the second avatar in the training room in the 3D VR environment, wherein completing the first training session comprises:

receiving, by the AI-based virtual agent, input from the first participant during the first training session; and generating, by the AI-based virtual agent during the first training session and in response to the input from the first participant, the conversational communication comprising at least a portion of question-and-answer interactions with the first participant; and generating, by the processor for the first and second participants, a respective digital certificate for completion of the first training session.

2. The method of claim 1, wherein the completion of the first training session is defined by at least one criterion.

3. The method of claim 1, further comprising:

scheduling, by the processor, a second training session of the plurality of training sessions for which the first training session is a prerequisite.

4. The method of claim 1, wherein the 3D VR environment is generated using a three-dimensional model based at least in part on photogrammetry.

5. The method of claim 1, wherein receiving the input further comprises:

receiving, by the virtual agent during the first training session, a natural language question from the first participant.

6. The method of claim 5, wherein generating the conversational communication comprises:

generating, by the virtual agent during the first training session, a natural language response to the natural language question.

7. The method of claim 1, further comprising:

determining, by the processor, a second training session of the plurality of training sessions for which the first training session is a prerequisite;

generating, by the processor based on the completion of the first training session, a training room for the second training session; and causing display, by the processor in the three dimensional virtual reality environment on the first and second participant devices, the training room for the second training session, the first avatar, the second avatar, and the virtual agent.

8. The method of claim 7, further comprising:

determining, by the processor, completion of the second training session; and sending, by the processor to the first and second participant devices, a respective digital certificate for completion of the second training session.

9. The method of claim 1, further comprising:

outputting, by the processor in the 3D VR environment, a navigation menu.

10. The method of claim 1, further comprising:

outputting, by the processor in the 3D VR environment, a selectable element associated with a video.

11. The method of claim 10, further comprising:
receiving, by the processor, input selecting the selectable element associated with the video.

12. The method of claim 11, further comprising:
initiating, by the processor, playback of the video in the 3D VR environment based on the input selecting the selectable element associated with the video.

13. The method of claim 1, further comprising:
outputting, by the processor in the 3D VR environment, a graphical element associated with a predetermined location.

14. A non-transitory computer-readable storage medium, the computer-readable storage medium including instructions that when executed by a processor, cause the processor to:
cause display of a three-dimensional (3D) virtual reality (VR) environment on a plurality of participant devices, each participant device associated with a respective participant of a plurality of participants;
cause display of a first avatar on a first participant device of the plurality of participant devices, wherein the first avatar is associated with a first participant of the plurality of participants, wherein the first participant is a customer service trainee;
cause display of a second avatar on a second participant device of the plurality of participant devices, wherein the second avatar is associated with a second participant of the plurality of participants, wherein the second participant is at least one of a trainer, a supervisor, and a manager;
determine, for the first and second participants, a respective subset of a plurality of training sessions;
output, in the 3D VR environment on the first and second participant devices, a respective timetable displaying the respective subset of the plurality of training sessions for the first and second participants, wherein the timetable displays at least one attribute of each training session in the respective subset of the plurality of training sessions for the first and second participants;
receive, from the first and second participant devices, respective indications of input selecting a first training session of the respective subset of the plurality of training sessions displayed in the respective timetables on the first and second participant devices;
cause display, in the 3D VR environment on the first and second participant devices, a training room for the first training session;
deploy, in the training room, an artificial intelligence (AI)-based virtual agent that conducts conversational communication with training room participants, wherein the virtual agent, the first avatar, and the second avatar are displayed in the training room in the 3D VR environment, wherein the virtual agent operates as a simulated customer receiving simulated customer service by the first participant;
complete the first training session via virtual interaction of the virtual agent, the first avatar, and the second avatar in the training room in the 3D VR environment, wherein the instructions to complete the first training session comprise instructions to:
receive, by the AI-based virtual agent, input from the first participant during the first training session; and
generate, by the AI-based virtual agent during the first training session and in response to the input from the first participant, the conversational communication comprising at least a portion of question-and-answer interactions with the first participant; and
generate, for the first and second participants, a respective digital certificate for completion of the first training session.

15. An apparatus, comprising:
a processor; and
a memory storing instructions that, when executed by the processor, cause the processor to:
cause display of a three-dimensional (3D) virtual reality (VR) environment on a plurality of participant devices, each participant device associated with a respective participant of a plurality of participants;
cause display of a first avatar on a first participant device of the plurality of participant devices, wherein the first avatar is associated with a first participant of the plurality of participants, wherein the first participant is a customer service trainee;
cause display of a second avatar on a second participant device of the plurality of participant devices, wherein the second avatar is associated with a second participant of the plurality of participants, wherein the second participant is at least one of a trainer, a supervisor, and a manager;
determine, for the first and second participants, a respective subset of a plurality of training sessions;
output, in the 3D VR environment on the first and second participant devices, a respective timetable displaying the respective subset of the plurality of training sessions for the first and second participants, wherein the timetable displays at least one attribute of each training session in the respective subset of the plurality of training sessions for the first and second participants;
receive, from the first and second participant devices, respective indications of input selecting a first training session of the respective subset of the plurality of training sessions displayed in the respective timetables on the first and second participant devices;
cause display, in the 3D VR environment on the first and second participant devices, a training room for the first training session;
deploy, in the training room, an artificial intelligence (AI)-based virtual agent that conducts conversational communication with training room participants, wherein the virtual agent, the first avatar, and the second avatar are displayed in the training room in the 3D VR environment, wherein the virtual agent operates as a simulated customer receiving simulated customer service by the first participant;
complete the first training session via virtual interaction of the virtual agent, the first avatar, and the second avatar in the training room in the 3D VR environment, wherein the instructions to complete the first training session comprise instructions to:
receive, by the AI-based virtual agent, input from the first participant during the first training session; and
generate, by the AI-based virtual agent during the first training session and in response to the input from the first participant, the conversational communication comprising at least a portion of question-and-answer interactions with the first participant; and
generate, for the first and second participants, a respective digital certificate for completion of the first training session.

* * * * *